(12) United States Patent
Kwon et al.

(10) Patent No.: US 6,381,400 B1
(45) Date of Patent: Apr. 30, 2002

(54) METHOD AND APPARATUS FOR CONTROLLING SPEED OF CAPSTAN MOTOR OF A VIDEO CASSETTE RECORDER

(75) Inventors: Young-gi Kwon; Jong-gyu Lee, both of Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/116,322

(22) Filed: Jul. 15, 1998

(30) Foreign Application Priority Data

Jul. 15, 1997 (KR) .............................. 97-32747

(51) Int. Cl.$^7$ ................................................ H04N 5/91
(52) U.S. Cl. .......................................................... 386/80
(58) Field of Search ........................... 386/6–8, 21, 78, 386/79, 80, 113, 114; 360/73.04, 73.09, 73.14

(56) References Cited

U.S. PATENT DOCUMENTS 4,716,473 A * 12/1987 Kondo ..................... 360/73.04
5,604,648 A * 2/1997 Oh ........................... 360/73.11

* cited by examiner

Primary Examiner—Wendy R. Garber
Assistant Examiner—Polin Chieu
(74) Attorney, Agent, or Firm—Dilworth & Barresse, LLP

(57) ABSTRACT

A method for controlling the speed of a capstan motor in a video cassette recorder (VCR) includes modulating a capstan frequency generating (CFG) signal into a pulse signal. Time intervals corresponding to one of a rising edge to a next rising edge and a falling edge to a next falling edge of the pulse signal are calculated. The calculated time intervals are compared to a target time to obtain a difference therebetween. A rotation speed of the capstan motor is compensated based on the obtained difference to control the rotation speed of the capstan motor.

6 Claims, 3 Drawing Sheets

$A \neq B$, $C \neq D$, $A = C$, $B = D$

METHOD AND APPARATUS FOR CONTROLLING SPEED OF CAPSTAN MOTOR OF A VIDEO CASSETTE RECORDER

BACKGROUND OF THE INVENTION

1. Field of the Invention

The present invention relates to video cassette recorders (VCRs) and, more particularly, to a method and an apparatus for controlling the speed of a capstan motor in a video cassette recorder (VCR).

2. Description of the Related Art

In general, a video cassette recorder (VCR) is a device for recording and reproducing a video signal and an audio signal recorded on a recording medium (i.e., a video cassette tape). The VCR can reproduce the recorded video signal at a normal, low or high speed, or can stop reproducing the signal.

The servo system of the VCR is divided into a drum servo which controls the rotation of a head, and a capstan servo which controls the track and maintains the running speed of the recording medium. Specifically, the capstan servo controls the phase and speed of the capstan motor so that the head which is allotted to each channel can accurately reproduce or playback the video signal of the relevant channel. The capstan servo also regularly maintains the running speed of the recording medium when reproducing or recording. The rotation speed of the capstan motor is controlled by obtaining a capstan speed error voltage from a capstan frequency generating (CFG) signal corresponding to the running speed of the recording medium. In the case of a low-speed reproducing, a temporary stop, a classifying operation, etc., a slow step signal outputted from the microcomputer is applied to the capstan motor.

The phase of the capstan motor is controlled by adding the capstan speed control voltage to a capstan phase error voltage which is obtained by comparing the frequency of a control signal with a reference frequency when reproducing.

In the case of minutely controlling the capstan motor, such as, for example, in low-speed reproducing, it is necessary to control the conventional capstan frequency generating (CFG) signal for a duration equal to one-half the period of the CFG signal. Conventionally, the speed control is performed by simultaneously detecting a high edge and a low edge of the CFG signal. That is, each time interval from a high edge to a low edge or a low edge to a high edge is detected and then compared with a predetermined target time interval, so that the speed of the capstan motor can be controlled based on the difference therebetween.

However, the conventional method for controlling the speed of a capstan motor is not without deficiency. Some of these deficiencies will now be described. First, when the capstan motor rotates at a constant speed, the time periods corresponding to each section of the pulse illustrated in FIG. 1 should be equal to each other (A=B=C=D). However, due to certain mechanical attributes of the capstan motor, the time periods corresponding to the high sections do not equal the time periods corresponding to the low sections (A≠B, C≠D, A=C and B=D). As a result, as the capstan motor rotates at a continuously varying speed, the capstan motor vibrates, thereby degrading the performance of the capstan servo. Second, due to the vibration of the capstan motor, undesirable noise is generated.

SUMMARY OF THE INVENTION

Therefore, it is an object of the present invention to stably control the rotation speed of a capstan motor, even when the time intervals corresponding to a high section and a low section of a capstan frequency generating signal are different.

It is another object of the present invention to provide a method and an apparatus for controlling the speed of a capstan motor in a video cassette recorder (VCR).

According to one aspect of the present invention, a method for controlling the speed of a capstan motor in a video cassette recorder (VCR) includes modulating a capstan frequency generating (CFG) signal into a pulse signal. Time intervals corresponding to one of a rising edge to a next rising edge and a falling edge to a next falling edge of the pulse signal are calculated. The calculated time intervals are compared to a target time to obtain a difference therebetween. A rotation speed of the capstan motor is compensated based on the obtained difference to control the rotation speed of the capstan motor.

According to another aspect of the present invention, an apparatus for controlling the speed of a capstan motor in a video cassette recorder (VCR) includes a capstan motor for transporting a recording medium at a predetermined speed, and generating a capstan frequency generating (CFG) signal. A pulse transformer modulates the CFG signal into a pulse signal. A delay unit generates a delayed pulse signal. A first adder adds the pulse signal and the delayed pulse signal to calculate time intervals corresponding to one of a rising edge to a next rising edge and a falling edge to a next falling edge of the pulse signal. A second adder adds a calculated time interval from the first adder and a target time interval to calculate the difference therebetween. A gain controller outputs a gain control signal to the capstan motor based on the difference calculated by the second adder.

Preferably, the apparatus includes an amplifier operatively coupled to the capstan motor and the pulse transformer for amplifying the CFG signal. Also, preferably the apparatus also includes a filter operatively coupled to the gain controller and the capstan motor for removing noise from the gain control signal.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

Figure 1:
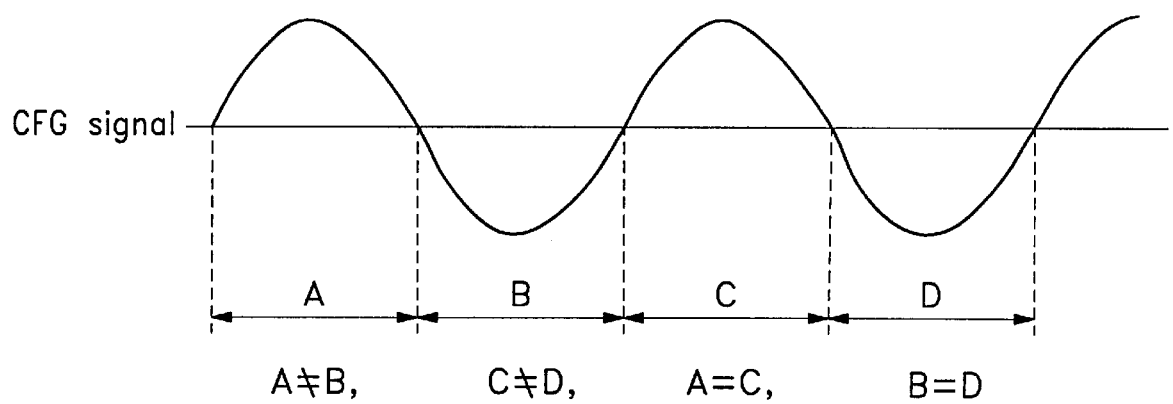
FIG. 1 is a waveform diagram illustrating a capstan frequency generating (CFG) signal for controlling the speed of a conventional capstan motor according to the prior art.
Figure 2:
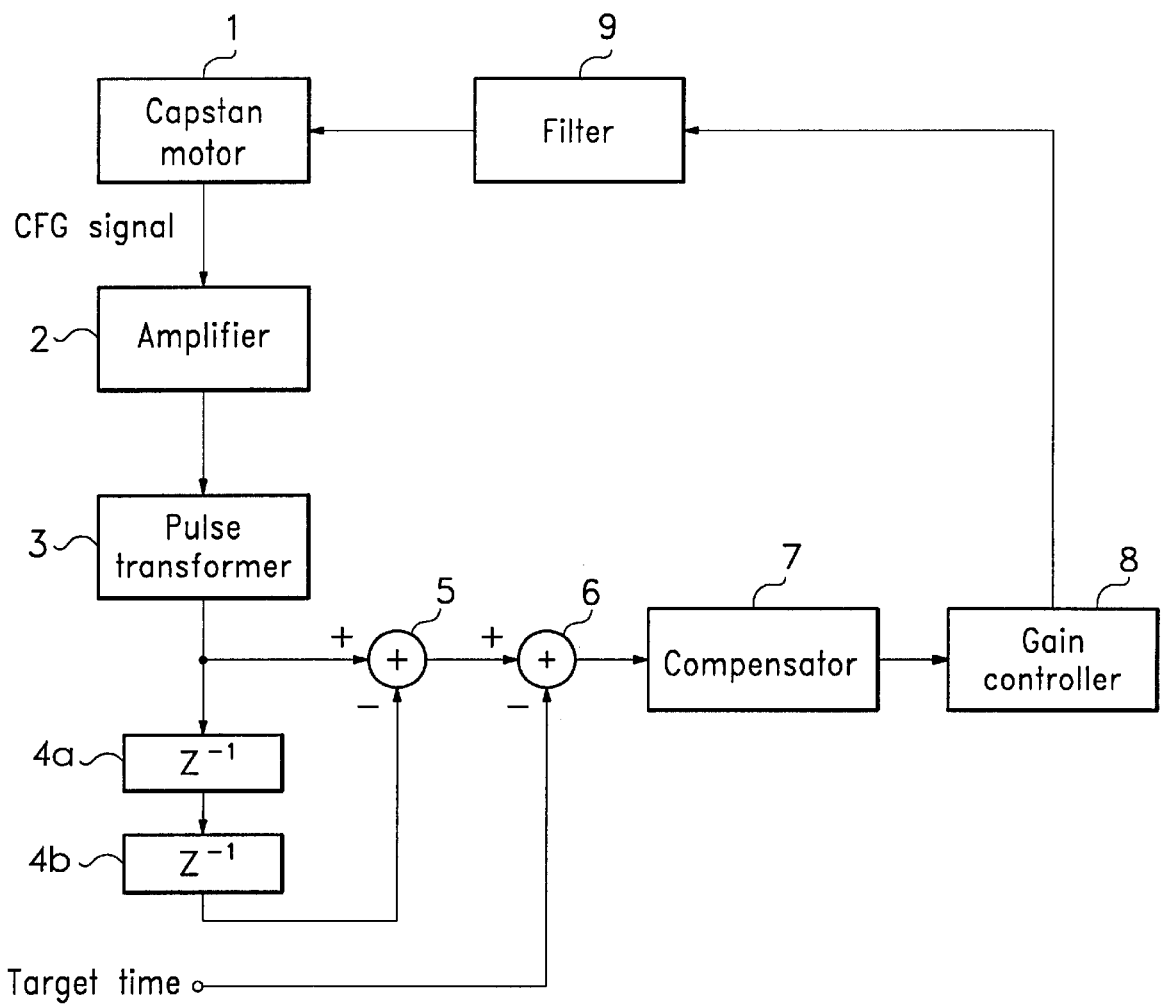
FIG. 2 is a block diagram illustrating an apparatus according to the present invention for controlling the speed of a capstan motor in a video cassette recorder (VCR)

Referring initially to FIG. 2, a block diagram is shown of an apparatus according to the present invention for controlling the speed of a capstan motor in a video cassette recorder (VCR). The apparatus includes a capstan motor 1 for transporting a recording medium at a predetermined speed, and generating a capstan frequency generating (CFG) signal. An amplifier 2 amplifies the CFG signal to an appropriate magnitude for signal processing. A pulse transformer 3 converts the amplified CFG signal into a pulse signal, which is outputted as time values (time points). A pair of delay units, 4a and 4b delay time values corresponding to the edges (i.e., rising and falling edges) of the pulse signal, and output the delayed time values. A first adder 5 adds the time values outputted from the pulse transformer to the time values outputted from the delay units 4a and 4b in order to calculate time periods from a rising edge to the next rising edge and from a falling edge to the next falling edge. A second adder 6 outputs a value based on the sum of a time period outputted from the first adder 5 and a target time period. A compensator 7 compensates or adjusts the value outputted from second adder 6. A gain controller 8 outputs a gain control signal according to the compensation value outputted from compensator 7, in order to control the gain of a voltage supplied to capstan motor 1. A low pass filter 9 filters noise from the gain control signal.

Figures 3A, 3B, 3C:
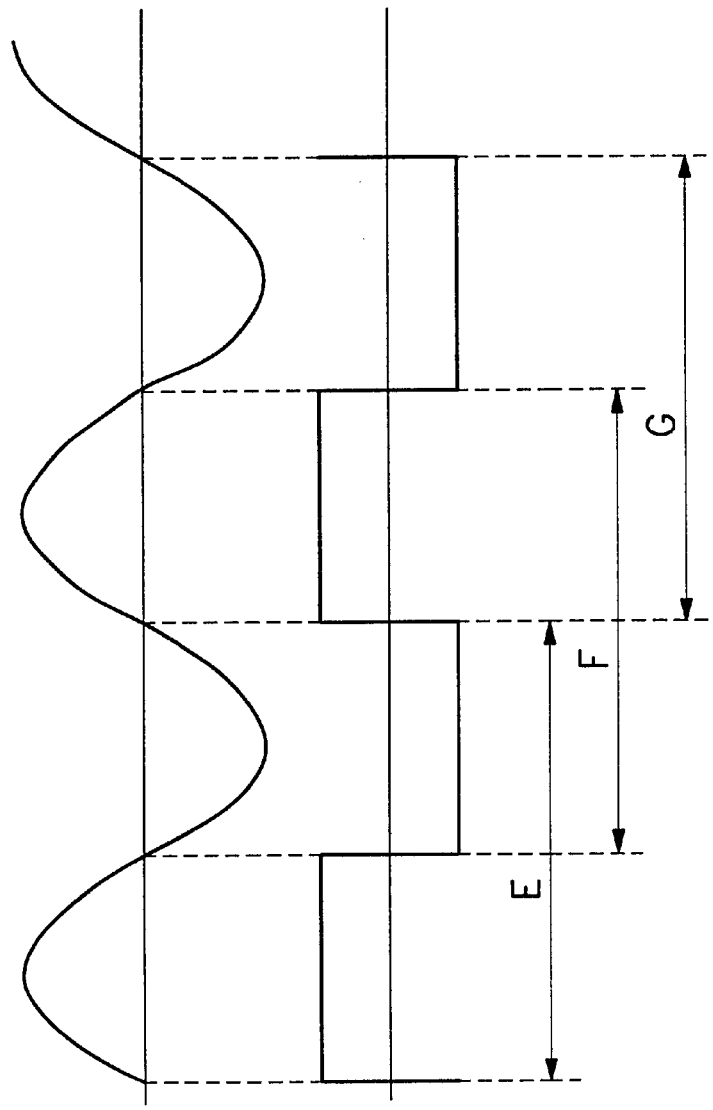
FIGS. 3A to 3C are waveform diagrams illustrating a CFG signal, an output of a pulse transformer, and an output of a first adder according to the present invention.

The operation of the present invention will now be described with reference to FIGS. 2 and 3A to 3C. The recording medium is transported at a speed corresponding to the rotation speed of capstan motor 1. At this time, the CFG signal corresponding to the rotation speed of capstan motor 1 is generated. The CFG signal, which is shown in FIG. 3A, is then amplified by amplifier 2. Subsequently, the amplified CFG signal is modulated or transformed into a rectangular pulse signal by pulse transformer 3, and then inputted to first adder 5. The rectangular pulse signal output from pulse transformer 3 is shown in FIG. 3B.

The rectangular pulse signal from pulse transformer 3 is outputted as time values (time points). The time values are inputted to first adder 5 and delay units 4a and 4b. The delay units 4a and 4b delay the time values with respect to each edge of the pulse signal. As a result, the time values of a high edge (rising edge) and the next high edge of the relevant pulse signal, as well as the time values of a low edge (falling edge) and the next falling edge of the relevant pulse signal are successively inputted to first adder 5.

Accordingly, first adder 5 calculates the time interval from the high edge to the next high edge of the relevant pulse signal and the time interval from the low edge to the next low edge. The output of first adder 5 is shown in FIG. 3C. At this time, the time intervals between each similar edge (high to high and low to low) are always the same (E=F=G).

The second adder 6 adds a time interval between similar edges outputted from the first adder 5 and a previously set target time interval in order to calculate the difference therebetween. Since the calculated difference is the difference between the target speed of the capstan motor 1 and the actual speed, the calculated difference is inputted to compensator 7 in order to compensate for that difference. In other words, compensator 7 modulates or adjusts a pulse width by the difference calculated by second adder 6 and then outputs the compensated signal. Afterwards, the output of compensator 7 is converted into a voltage which is supplied to capstan motor 1 by gain controller 8. After noise in the output of compensator 7 is filtered through low pass filter 9, the output is supplied to capstan motor 1. After that, capstan motor 1 rotates at the target speed.

Since the time values of the high edge and the low edge are repeatedly detected, the present invention provides the same effect as if the CFG signal outputted from the capstan motor 1 is multiplied by 2. Moreover, the detection of time periods based on the time interval from one high edge to the next high edge or the time interval from one low edge to the next low edge, allows the detected time periods to be corrected to be equal to each other.

The method and apparatus for controlling the speed of a capstan motor in a VCR according to the present invention provides numerous advantages over the prior art method for performing the same. Some of these advantages will now be discussed. First, by detecting time intervals of the CFG signal on a per period basis from one high edge to the next high edge and from one low edge to the next low edge, the rotation speed of the capstan motor can be stably controlled, even if the time interval between a high edge to a following low edge of the CFG signal is different than the time interval from the following low edge to a next high edge. Second, the repeated detection of time values corresponding to both high and low edges results in the same effect as if the CFG signal outputted from the capstan motor was multiplied by two (2). As a result, the rotation speed of the capstan motor may be minutely controlled. Third, since the rotation speed of the capstan motor is stably maintained even during low-speed reproducing, vibration of the reproduced image can be prevented. Finally, by stably maintaining the rotation speed of the capstan motor, noise can be prevented and the performance of the capstan servo can be ensured.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for controlling the speed of a capstan motor in a video cassette recorder (VCR), comprising the steps of:

modulating a capstan frequency generating (CFG) signal into a pulse signal;

calculating time intervals corresponding to both a rising edge to a next rising edge and a falling edge to a next falling edge of the pulse signal;

comparing the calculated time intervals to a target time to obtain a difference therebetween; and compensating a rotation speed of the capstan motor based on the obtained difference to control the rotation speed of the capstan motor.

2. The method of claim 1, wherein said calculating step comprises the steps of:

adding a time value corresponding to a rising edge of the pulse signal and a time value corresponding to a delayed rising edge of the pulse signal; and adding a time value corresponding to a falling edge of the pulse signal and a time value corresponding to a delayed falling edge of the pulse signal.

3. An apparatus for controlling the speed of a capstan motor in a video cassette recorder (VCR) comprising:

a capstan motor for transporting a recording medium at a predetermined speed, and generating a capstan frequency generating (CFG) signal;

a pulse transformer for transforming the CFG signal into a pulse signal;

a delay unit for generating a delayed pulse signal;

a first adder for adding the pulse signal and the delayed pulse signal to calculate time intervals corresponding to both a rising edge to a next rising edge and a falling edge to a next falling edge of the pulse signal;

a second adder for adding a calculated time interval from said first adder and a target time interval to calculate the difference therebetween; and a gain controller for outputting a gain control signal to the capstan motor based on the difference calculated by the second adder.

4. The apparatus of claim 3, further comprising an amplifier operatively coupled to said capstan motor and said pulse transformer for amplifying the CFG signal.

5. The apparatus of claim 3, further comprising a filter operatively coupled to said gain controller and said capstan motor for removing noise from the gain control signal.

6. The apparatus of claim 3, further comprising a compensator operatively coupled to said second adder and said gain controller for compensating the difference from the second adder.

* * * * *